United States Patent [19]
Urai et al.

[11] Patent Number: 5,333,933
[45] Date of Patent: Aug. 2, 1994

[54] SEAT WITH A TRIM COVER ASSEMBLY HAVING PLURAL STITCHES THEREON

[75] Inventors: Muneharu Urai; Kazuo Katsuta; Minoru Hosoya; Tatafumi Abe; Ryosuke Wada, all of Akishima, Japan

[73] Assignee: Tachi-S Co. Ltd., Akishima, Japan

[21] Appl. No.: 838,374

[22] Filed: Feb. 19, 1992

[30] Foreign Application Priority Data

Feb. 21, 1991 [JP] Japan .................. 3-049053

[51] Int. Cl.$^5$ ............................................. A47C 7/02
[52] U.S. Cl. .............................. 297/452.1; 297/219.1
[58] Field of Search ........... 297/219, 452, 218, 458, 297/459

[56] References Cited
U.S. PATENT DOCUMENTS

| | | | |
|---|---|---|---|
| 2,772,725 | 12/1956 | Leasure | 297/219 X |
| 3,298,047 | 1/1967 | Feinerman | 297/219 X |
| 3,630,572 | 12/1971 | Homier | 297/219 X |
| 4,306,750 | 2/1981 | Wenger et al. | 297/459 X |
| 4,747,638 | 5/1988 | Saito . | |
| 4,867,508 | 9/1989 | Urai | 297/452 |

FOREIGN PATENT DOCUMENTS 31604 3/1974 Japan .
131784 1/1986 Japan .

Primary Examiner—Laurie K. Cranmer
Attorney, Agent, or Firm—Oldham, Oldham & Wilson Co.

[57] ABSTRACT

A seat with a trim cover assembly having plural stitches thereon, wherein the stitches are arranged in a non-parallel relation with one another on one unitary sheet of the trim cover assembly which is affixed over a cushion body. Those patterns of stitches are formed at one time by means of a multiple-needle sewing machine.

7 Claims, 10 Drawing Sheets

SEAT WITH A TRIM COVER ASSEMBLY HAVING PLURAL STITCHES THEREON

BACKGROUND OF THE INVENTION

1. Field of Invention

The present invention relates to a seat such as an automotive seat, and in particular to the seat having a trim cover assembly on which plural decorative stitches are formed.

2. Description of Prior Art

All the hitherto known automotive seats include such a seat that comprises a foam cushion body molded in a foaming process using a polyurethane material, and a trim cover assembly covering the foam cushion body. Recent years witness that forming plural decorative stitched seams on the trim cover assembly has been practiced increasingly. It is thought advisable to use a multiple-needle sewing machine to create such plural stitches in a parallel fashion at one time so as to meat a required mass-production of this kind of seat. (See, for example, the Japanese Laid-Open Pat. Pub. No. 64-34394).

However, this parallel stitching has been found difficult for application to such new mode of seat cushion with a protruded portion which is sloped or inclined in its longitudinal direction, because, if a unitary sheet of trim cover assembly is affixed over the uneven upper surface of seat cushion, the plural stitched seams on the trim cover assembly are twisted or deformed into an objectionable non-rectilinear or non-parallel pattern.

Possible solution may be to prepare a plurality of separate sections having parallel stitches thereon by use of multiple-needle sewing machine and then sew them together to form a suitable trim cover assembly that lies along the upper surfaces and the protruded portion on the cushion body. According to this technique, plural decorative stitched seams (41, 42, 43 ...) are formed in parallel with one another upon the respective three separate sheets of trim cover assembly (1) and sewn together at the joint lines (101) as shown on FIG. 1(A). With further reference to FIGS. 1(A) and 1(B), each of the three sheets should be prepared as best shown in FIG. 1(B): A central section (11-1), a left-side lateral section (11-2) and a right-side lateral section (11-3). Then, they are each formed with their own parallel stitch patterns (41, 42, 43) by means of multiple-needle sewing machine (see at (M) in FIG. 4). Thereafter, considering the fact that the parallel stitches in the two lateral sections (11-2) (11-3) must be inclined in conformity with the inclination angle of the sloped, protruded portion of the cushion body, some hand operation steps are carried on to cut the respective lateral ends of lateral sections (11-2) (11-3) at such inclination angle as indicated by (100) in FIG. 1(B), conforming to that particular inclination angle, and then sew them with the central section (11-1) to obtain such representation of a whole trim cover assembly (1), or strictly stated a representation of a seating surface section of a trim cover assembly (1). As shown in FIG. 1(C), the trim cover assembly (1) is of a three-layer lamination structure including a top surface layer (111), wadding (112) and wadding cover (11 3). Consequently, the trim cover assembly (1) thus formed is affixed over the cushion body, whereupon the two lateral sections (11-2) (11-2) thereof are displaced towards the protruded portion (H). Hence, there is obtained such a trim cover assembly (1).

Nonetheless, this approach involves quite troublesome and intricate steps on the worker's part to put together those separate trim cover sections, and the joint lines (101) poses an objectionable point on the seat, not contributing to improvement on the aesthetic appearance of seat. What is worse, it is impossible to subject a whole unitary sheet of trim cover assembly to stitching at one time by means of ordinary rectilinear-sewing-type multiple-needle sewing machine.

SUMMARY OF THE INVENTION

In view of the above-stated shortcomings, it is thus a purpose of the present invention to provide a seat with a trim cover assembly on which there may be arranged plural parallel and non-parallel stitches in combination, without putting together separate trim cover sections.

To achieve this purpose, according to the present invention, there is provided a unitary sheet of trim cover assembly so designed as to be folded into a state permitting the multiple-needle sewing machine to form stitches thereon in a non-parallel relation with another stitches.

In one aspect of the invention, there is provided a unitary sheet of trim cover assembly so shaped as to permit the sewing machine to form stitches thereon in a slant way in conformity with a protruded portion of cushion body so as to present decorative stitched seams extending slant in parallel with the protruded portion.

In another aspect, an expanded trim cover assembly with thus-formed non-parallel stitches may be affixed directly over a flat cushion body, so as to give a different representation of stitch patterns on a flat seat.

DETAILED DESCRIPTION OF PREFERRED EMBODIMENTS OF THE INVENTION

Hereinafter, a specific description will be made of a seat with a trim cover assembly having plural stitches thereon in accordance with the present invention. It should be noted that the present invention is made on the basis of the previously stated conventional elements and sewing machine, i.e. a cushion body having a protrudent portion, and multiple-needle sewing machine (M) with a work table (17). Hence, all like designations in the prior art description correspond to all like ones in this description.

Referring firstly to FIGS. 2(A) to 2(D) and 4, there is illustrated a first embodiment of a seat in accordance with the present invention.

Figure 2A:
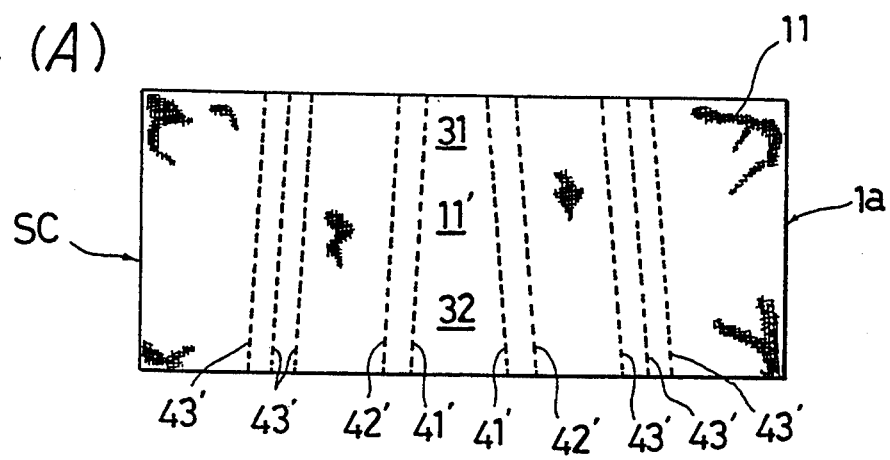
FIG. 2(A) is a plan view of trim cover assembly in accordance with the present invention, showing a first embodiment thereof.
Figure 2B:
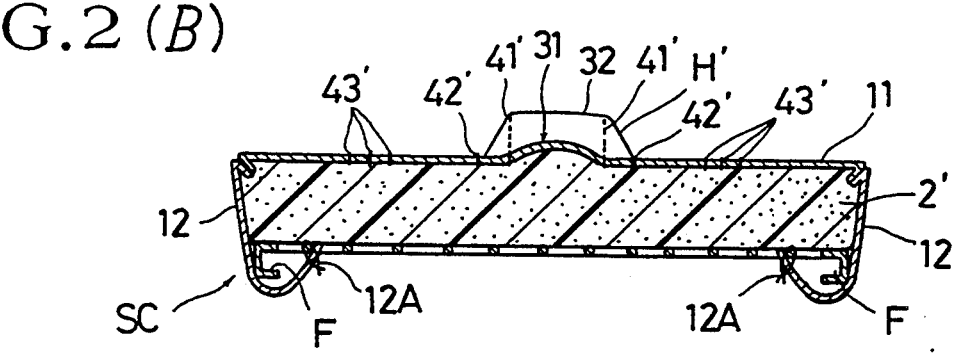
FIG. 2(B) is a sectional view taken along the line B—B in FIG. 2(A)
Figure 2C:
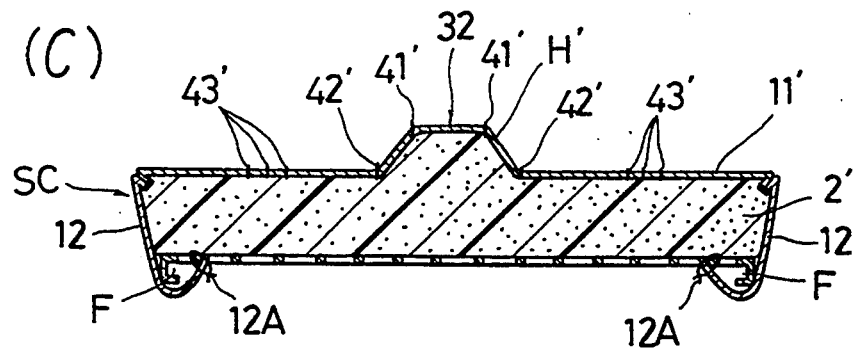
FIG. 2(C) is a sectional view taken along the line C—C in FIG. 2(A)

Designation (SC) refers to a seat cushion in in this embodiment, which comprises a foam cushion body (2') molded in a foaming process, using a urethane material, which has a protruded portion (H') formed centrally thereon, and a trim cover assembly (1a) affixed over the foam cushion body (2'), on which are represented plural stitched seams (41', 42', 43') in the shown pattern. As best shown in FIGS. 2(B) and 2(C), the trim cover assembly (1a) is at its central seating section (11) bonded to the upper surface of cushion body (2'), with the peripheral ends thereof being sewn with a separate lateral trim cover section (12). The lateral trim cover section (12) is in turn anchored to the bottom side of cushion body (2'), or in other words, the free peripheral ends of that lateral section (12) is fixed to a frame (F) by means of hog rings (12A), the frame (F) being secured at the bottom of cushion body (2'). It is thus noted that the lateral trim cover section (12) is not bonded to the mating lateral wall of cushion body (2').

With regard to the cushion body (2'), its protruded portion (H'), as slightly different than the foregoing one in the prior art, has, defined therein, a narrowed area (31) and a widened area (32), such that its mass per se converges from the widened area (32) toward the narrowed area (31), while being sloped or inclined at its upper surface at a certain inclination angle as likewise in the prior art protruded portion.

The trim cover assembly (1a) is in a unitary sheet state, and the representation of the stitches (41', 42', 43') on the trim cover assembly (1a) affixed over the cushion body (2') is such that an inner pair of stitched seams (41'), an outer pair of stitched seams (42') and a pair of three stitched seams (43') extend slant towards the central line of seat cushion (SC) in a symmetrical fashion relative thereto, with all the stitch lines having a parallel relation with one another. In this respect, both inner and outer pairs of stitched seams (41', 42') lie along the respective lateral surfaces of protruded portion (H'), whereas other stitched seams (43') lie on the left- and right-side flat surfaces of cushion body (2'), respectively, as viewed from FIGS. 2(A), 2(B) and 2(C). It is thus to be understood that, due to the protruded portion (H') diverging in mass from its narrowed area (31) to widened area (32) at a certain angle, all the stitches (41', 42', 43') also diverges at the same angle, establishing a parallel relation with the respective side surfaces of protruded portion (H'), and for this reason, in FIG. 2(A), those decorative stitches are shown as extending in a symmetrically converging fashion relative to the protruded portion (H').

Figure 2D:
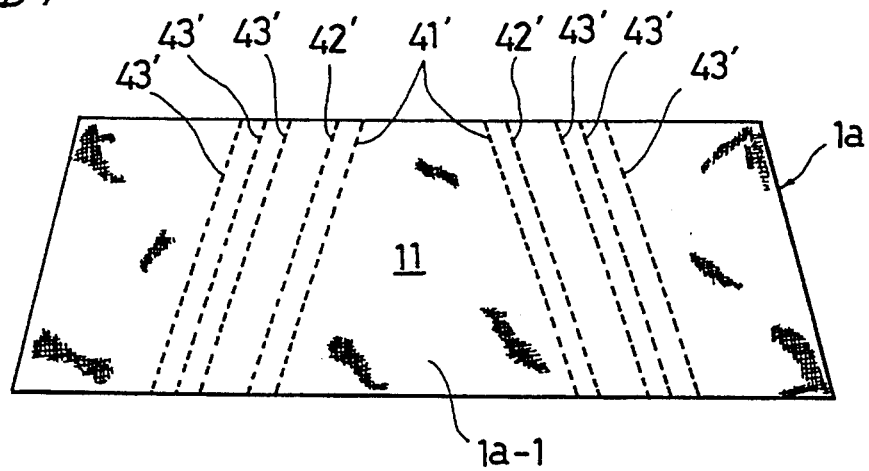
FIG. 2(D) is a plan view of expanded trim cover assembly.
Figure 2:
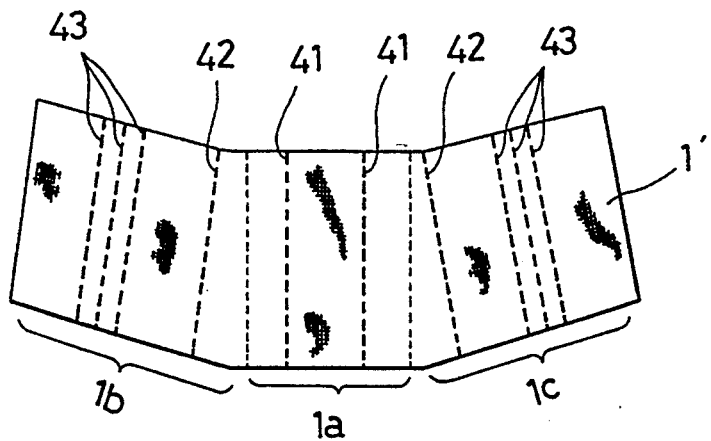
FIG. 2(E) is a plan view of expanded trim cover assembly as a second embodiment in accordance with the present invention.
FIG. 2(F) is a perspective of the trim cover assembly as in FIG. 2(E), explaining one step of stitching the trim cover assembly.
Figure 2:
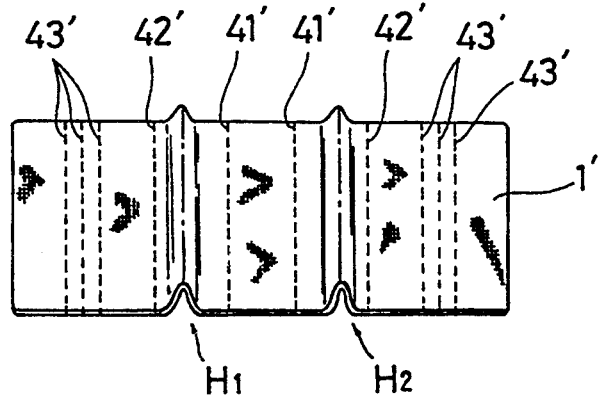
Figure 4:
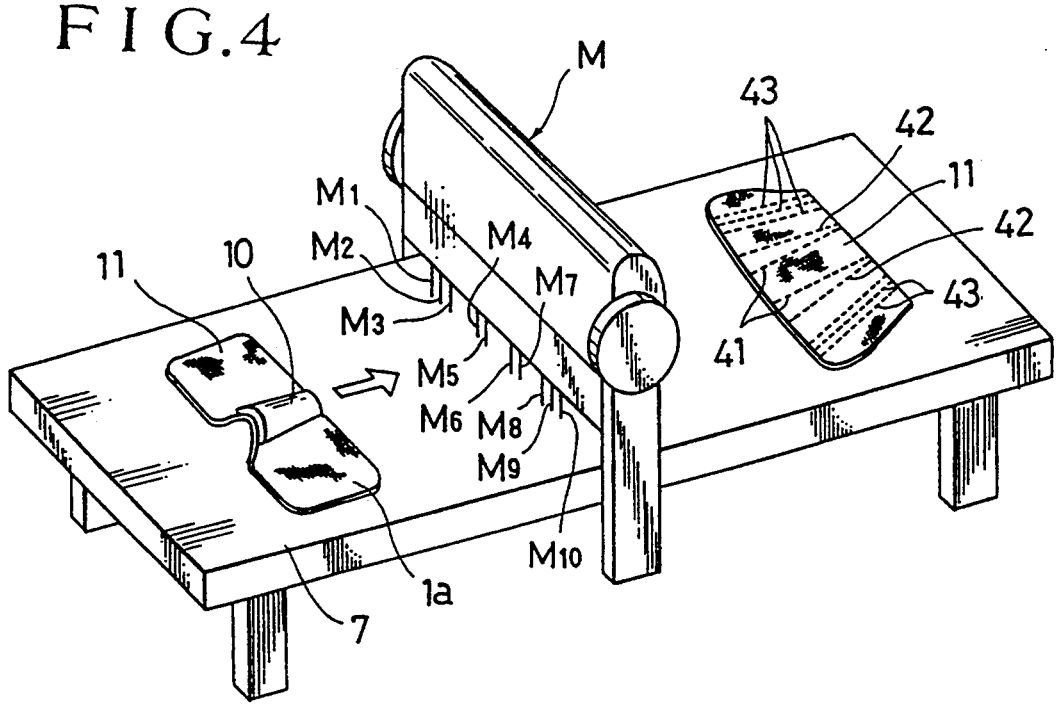
FIG. 4 is a schematic perspective of multiple-needle sewing machine.

Fabrication of the above trim cover assembly (1a) originates from the expanded unitary sheet of same illustrated in FIG. 2(D). As shown, the whole shape of trim cover assembly thus expanded generally assumes a trapezoid, having both inclined side edges which extend in parallel with the respective right-side and left-side sets of slant stitches (41', 42', 43') symmetrical relative to the sector-like central region (1a-1). Essentially, the total area of such central region (1a-1) should be such as to cover the upper surface of protruded portion (H'), excepting both lateral surfaces thereof on which the inner and outer pairs of stitches (41')(42') lie. In the practical stitching process, in brief, the steps consists in firstly pinching upwardly the central region (1a-1) of expanded original trim cover assembly (1a) while insuring that it is sloped or inclined at an angle generally equal to that of protruded portion (H'), so that both side edges of trim cover assembly are displaced from its inclined state to the vertical state in relation to the upper and lower edges, as viewed from FIGS. 2(A) and 2(D), thereby transforming the trapezoidal outer contour of trim cover assembly (1a) into generally such a rectangular one as in FIG. 2(A), and then using a retaining member (10) (see FIG. 4) to retain the pinched or folded portion of trim cover assembly (1a) as it is. Thereafter, the trim cover assembly (1a) is fed to the multiple-needle sewing machine (M) as shown in FIG. 4. In this context, i t can be observed that the inclination angles respectively of both inclined side edges of expanded trim cover assembly (1a) are naturally equal to that of protruded portion (H'). Consequently, when the stitched trim cover assembly (1a) is affixed over the cushion body (2'), the stitch pattern thereon results in such representation in a rectangular profile of trim cover assembly as seen in FIG. 2(A).

Reference is now made to FIGS. 3(A) and 3(B) in which there is shown a second embodiment of seat in accordance with the present invention.

In this embodiment, the seat (S) is formed in a flat manner, which comprises a flat foam cushion body (2'') molded in a foaming process, using a urethane material, and a trim cover assembly (1') having parallel and non-parallel stitched seams (41, 42, 43) formed thereon in combination.

Figure 3:
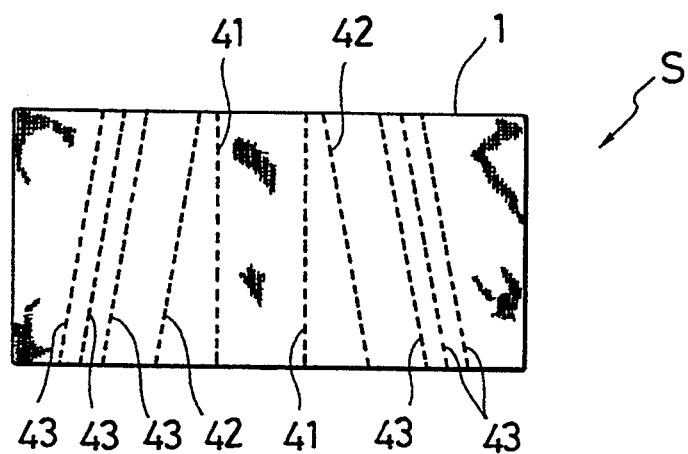
FIG. 3(A) is a plan view of the trim cover assembly affixed over a cushion body.
FIG. 3(B) is a sectional view of a seat covered with the trim cover assembly.
Figure 3:
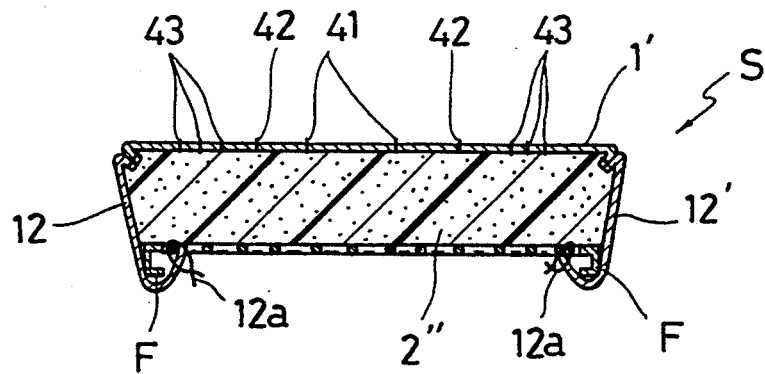
Figure 5:
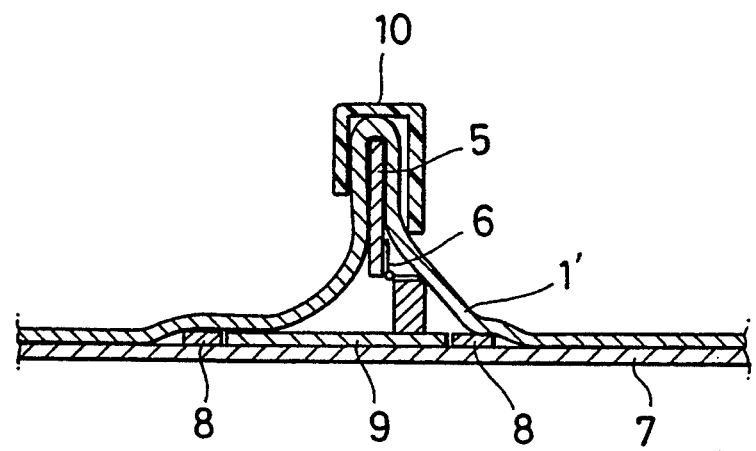
FIG. 5(A) is a sectional view of first embodiment of feeding device in the present invention, showing the state where a hinged guide member is set in an upright position.
FIG. 5(B) is a sectional view of the same first embodiment, showing the state where a hinged guide member is set in a horizontal position.
Figure 5:
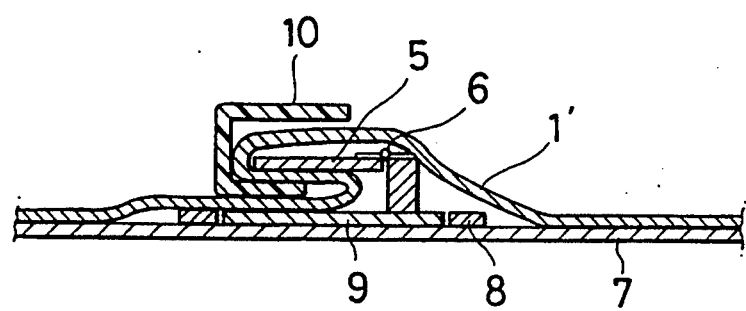
Figure 6:
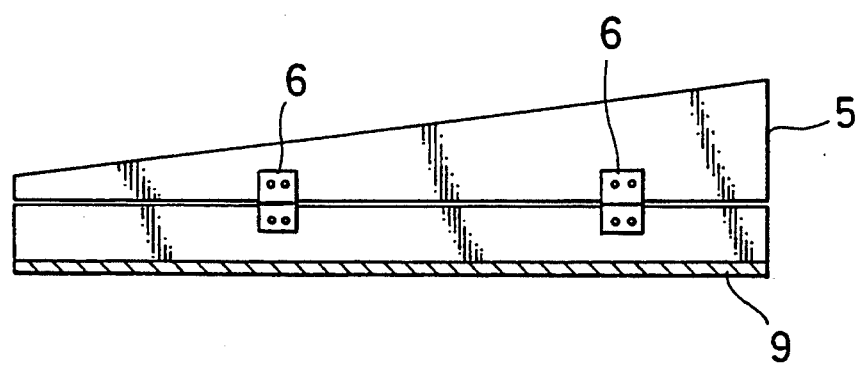
FIG. 6 is an elevation side view of the hinged guide member.
Figure 7:
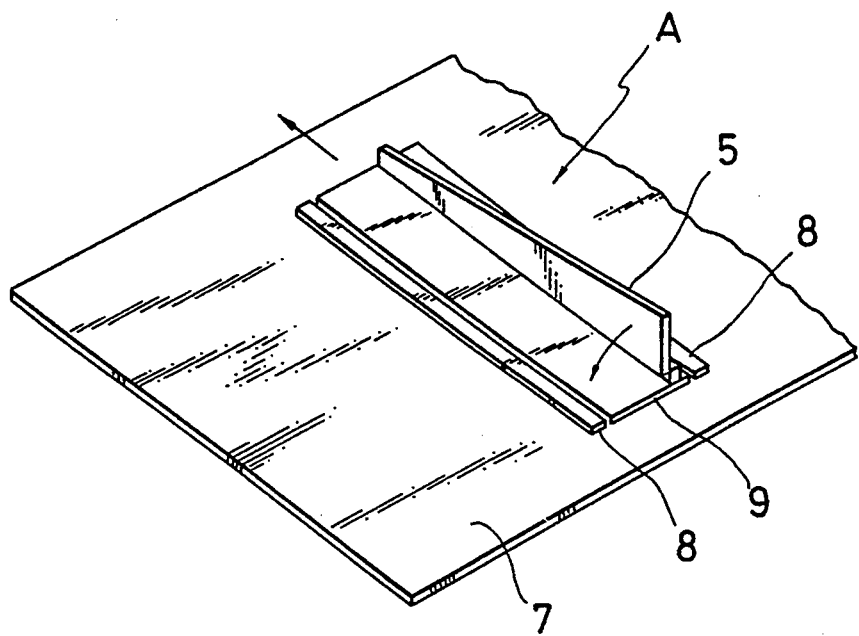
FIG. 7 is a partly broken perspective view of a table of the sewing machine, showing the hinged guide member to be mounted on the table.

As best shown in FIG. 3 (B), the trim cover assembly (1') is at its seating section bonded to the upper flat surface of cushion body (2") by means of an adhesive, with its peripheral ends being sewn with separate trim cover lateral sections (12'). The lateral sections (12') is at their lower free ends anchored to a frame (F) by means of hog rings (12a), the frame (F) being secured at the bottom of cushion body (2").

Looking at FIG. 3 (A), the representation of the decorative stitches (41, 42, 43) on the trim cover assembly affixed over the cushion body (2") is such that a central pair of stitched seams (41)(41) extends in parallel with one another in a direction across and lengthwise of the seat (S), and other seams (42) (43) extend in a non-parallel or slant way relative to the central two ones (41); namely, in a manner converging toward same in a symmetrical fashion relative thereto.

In order to produce such trim cover assembly (1'), a description will now be made of several methods as below.

Referring firstly to FIGS. 2(E) and 2(F), let us describe a concept of allowing the trim cover assembly (1') to be formed with a combination of parallel stitched seams (41) and non-parallel or slant stitched seams (42, 43), by use of the ordinary multiple-needle sewing machine (M). In order to produce the seat cushion (S) having such mixed parallel and non-parallel stitch patterns, it is essential to initially prepare such trim cover assembly as shown at the exploded state in FIG. 2(E). Although this FIG. 2(E) illustrates a resultant trim cover assembly (1') that has been sewn by the sewing machine (M), yet let it be assumed that the same trim cover assembly (1') without those stitch patterns (41, 42, 43) is prepared, which implies the cover element (1') to be in the state prior to sewing by the machine (M). Hence, as can be seen in FIG. 2(E), the trim cover assembly (1') is profiled slightly in U shape on the plane, such that both right- and left-side sections (1b)(1c) are inclined upwardly relative to the respective vertical lines of boundaries defined at both sides of central section (1c), at the same inclination angle.

Now, looking at FIG. 2(F), it is seen that the two areas as indicated by the one-dot chain lines (H1)(H2) in the trim cover assembly (1'), may be pinched upwardly such as to simultaneously displace its both lateral sections (1b)(1c) towards its central section (1a), so that the whole shape of trim cover assembly (1') is transformed into the rectangular shape. In that way, as in FIG. 2(F), the imaginary stitch lines (41", 42", 43") are all disposed in a parallel relation with one another. The imaginary stitch lines (41", 42", 43") are hereby defined to imply sewing traces to be drawn by the needles (M1, M2 . . . M9) of sewing machine (M) upon the trim cover assembly (1') and also imply the resultant stitched seams (41, 42, 43).

Therefore, the rectangular state of trim cover assembly (1') thus created, as shown in FIG. 2(F), effectively permits direct use of the multiple-needle sewing machine (M) for stitching the trim cover assembly (1').

The above-discussed method will be clarified by way of several embodiments shown in FIGS. 5 through 14.

Referring now to FIGS. 5 through 8, there is illustrated a first embodiment of the present invention. In these figures, only one feeding device (A) is shown, but it should be noted that the same feeding device is provided in a spaced-apart and parallel relation with that former one, thus, there are provided a pair of feeding devices (A) in this particular embodiment. Each of the two feeding devices (A) should be formed in a size smaller than the width defined by the two imaginary stitch lines (41")(42") as understandable from FIGS. 5 and 6. Further, they are each arranged at a position corresponding to the respective areas defined between the stitched seams (41)(42).

Description will, for the simplicity sake, be made only of the left-side one of the two feeding devices (A). According to the present first embodiment, fixed on the work table (7) of multiple needle sewing machine (M), is a pair of guide rails (8) both extending in parallel with each other along the sewing direction of machine (M) as indicated by the arrow in FIG. 7. Though not shown, one end of the guide rails (8) terminates adjacent to the needle area of sewing machine (M). A movable guide member (9) is slidably fitted between those two guide rails. The movable guide member (9) is made of a plate-like material, having an upper hinged guide section (5) erected from the guide member (9). The upper hinged guide section (5) comprises two separate upper and lower parts, both of which are connected together by a hinge (6) such that the upper part is rotatable on and relative to the lower one that is fixed on the movable guide member (9). In the embodiment shown, the upper part of hinged guide section (5) can be turned outwardly of the guide member (9) down to a substantially horizontal line (see FIG. 5 (B)), representing approx. 90-degree rotation range from the upright position (as in FIG. 5(A)) to that horizontal securing position.

In FIG. 4, the hinged guide section (5) is depicted as being formed straight lengthwise, such that its height increases from the left-side end to the right-side end, defining a sloped upper edge. In this context, the relatively lower left side end is to be situated near the needle area of sewing machine (M).

In operation, as a first step, referring to FIG. 5(A), the guide section (5) is set in an upright state, and then one unitary sheet of trim cover assembly (1') is placed upon the top end of that guide section (5) and part-way squeezed there slightly, while laying the remainder over the movable guide member (8) and table (7). Thereafter, a cap-like securing member (10) is fitted over the top end of guide section (5) so that the trim cover assembly (1') is firmly secured at the guide section (5).

Figure 8:
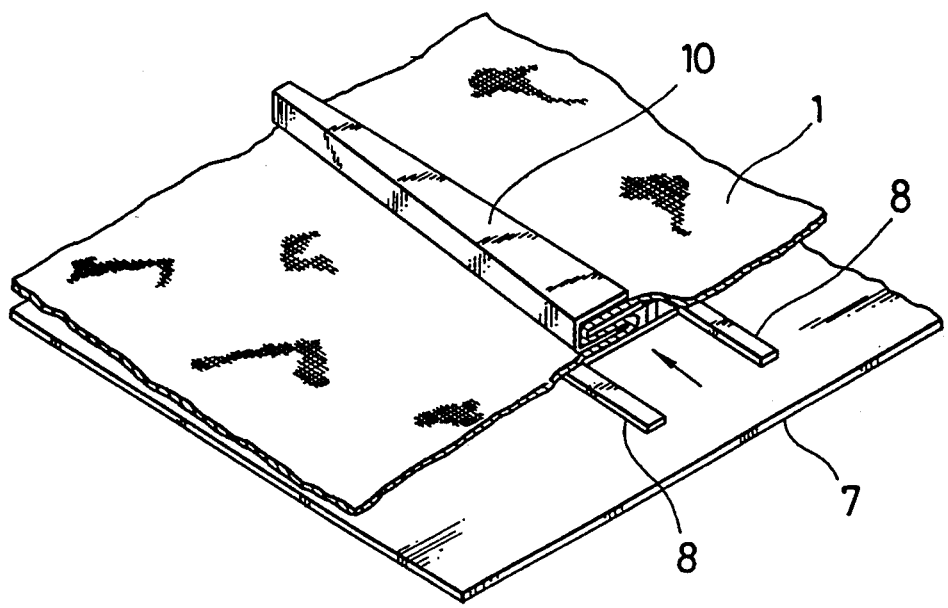
FIG. 8 is a partly broken perspective view showing the trim cover assembly to secured on the hinged guide member.

The securing member (10) is formed from a material of generally channel shape in section, and in a shape conforming to that of guide section (5), as can be seen from FIG. 8. Thus, the lower edges of securing member (10) are sloped at the same inclination angle with the upper edge of guide section (6).

Then, as shown in FIGS. 5(B) and 8, the hinged upper part of guide section (5) is turned down together with the relevant part of trim cover assembly (1'), from the upright setting position to the horizontal securing position. The securing effect is thus enhanced, because the trim cover assembly (1') is folded in a positive way by thus-turned guide section in addition to the securing member (10). Further, the height of trim cover assembly (1') at this area is lowered as compared with that in the erected state in FIG. 5(A). This advantageously allows for avoiding the interference of the hinged guide section (5) with the sewing needles of machine (M).

It is thus to be understood that both guide sections of two feeding devices (A) are turned outwardly away from each other in relation to the spacing therebetween and then respectively laid on the position shown in FIG. 5(B).

Under this state, the movable guide member (9) is translated along the guide rails (8) in the direction as shown in FIG. 8, so that the trim cover assembly secured thereby is fed towards the needle area of multiple-needle sewing machine (M). As viewed in FIG. 8, upon the sewing machine (M) being operated, the left-side end portion of trim cover assembly (1') is subjected to multi-needle stitching, and then, by virtue of feeding force created by the vertical reciprocations of plural needles (M1 ... M9), the cover member (1') continues to be fed to the sewing machine (M) for the stitching purpose.

At the completion of stitching, the resulting trim cover assembly (1') is removed from the foregoing feeding devices (A). As a result, the expanded trim cover assembly (1')assumes such stitched pattern representation as in FIG. 2(E) in which a pair of parallel stitched seams (41)(41) run vertically across the trim cover assembly (1'), while a pair of non-parallel or slant stitched seams (42) (42) and there pairs of likewise slant stitched seams extend on the opposite sides of and symmetrically relative to that central paired parallel stitched seams (41) (41).

Thus-finished trim cover assembly (1') is then stretched over and secured upon the outer surfaces of cushion body (2'').

Figure 9:
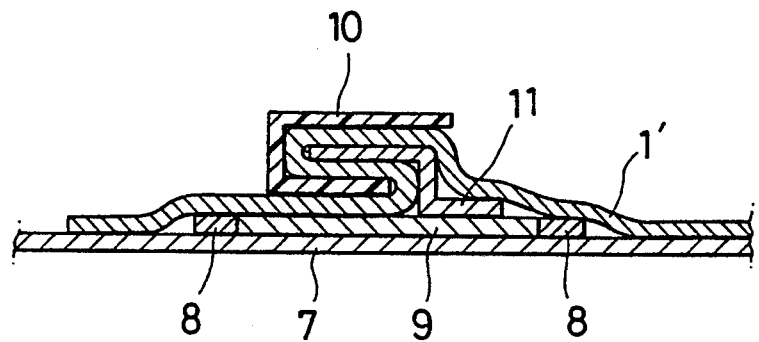
FIG. 9 is a sectional view showing second mode of guide member in association with the first embodiment.

FIG. 9 shows a second embodiment of feeding device. In this embodiment, in place of the abovedescribed hinged guide section (5), there is fixed a bent securing member (11) on the movable guide member. The securing member (11) is formed by bending same in the lateral direction thereof into the shape indicated in FIG. 9. In operation, the trim cover assembly (1') is laid over this securing member (11), and thereafter; the cap-like securing member (10) is pushed towards the free end of the securing member (11) in the direction laterally thereof so as to secure the relevant portion of trim cover assembly (1') firmly upon that free end of securing member (11). This brings about the same situation as in FIGS. 5(B) and 8. Then, trim cover assembly thus secured is fed to the sewing machine (M). The result comes likewise as explained above.

Figure 10A:
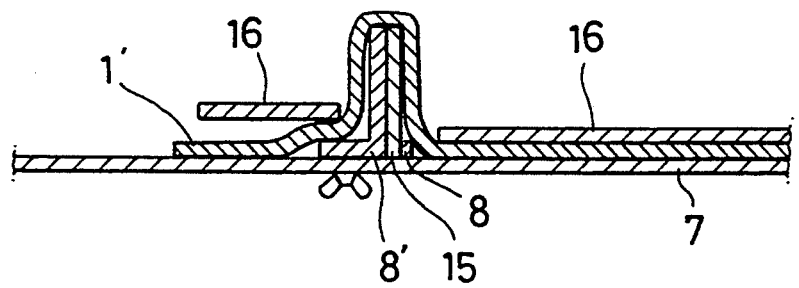
FIG. 10(A) is a sectional view of third embodiment of feeding device.
Figure 10B:
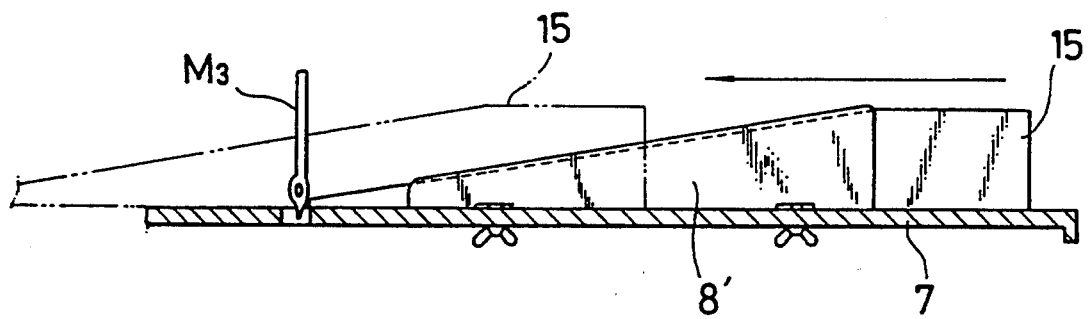
FIG. 10(B) is an elevation view of the feeding device as in FIG. 10(A)

FIGS. 10(A) and 10(B) show a third embodiment of feeding device in which, as an equivalent to the hinged guide member (5), there is provided an upstanding movable guide member (15) having the same sloped upper edge with that of upper hinged part of hinged guide member (5). As shown, in this particular embodiment, only one guide rail (8) is fixed on the work table (7), and in a spaced-apart and parallel relation with that guide rail (8), an L-shaped guide rail (8') is fixed on the same table (7). Slidably inserted between those two different guide rails (8) (8'), is the foregoing upstanding movable guide member (15), such that the movable guide member (5) may be moved in the arrow direction as in FIG. 10(B), upon the table (7). In operation, as can be seen from FIG. 10 (A), the trim cover assembly (1') is laid upon the movable guide (15), and then weight plates (16) are placed on the opposite sides of the trim cover assembly (1'). Thus, the relevant portion of cover member (1') is stretched sufficiently along the upper sloped edge of guide member (15). Thereafter, both trim cover assembly and guide member (15) are fed to the sewing machine (M).

Figure 11A:
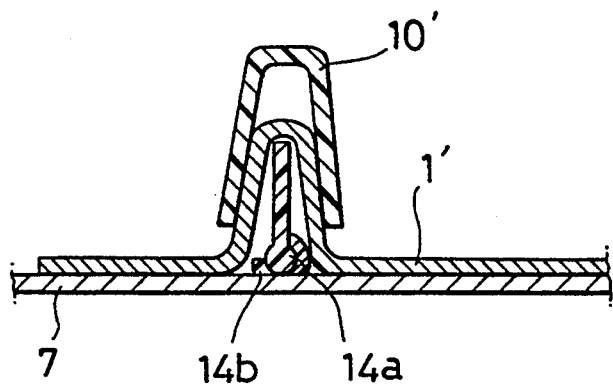
FIG. 11(A) is a sectional view of fourth embodiment, showing the state of the trim cover assembly being secured to a guide member by a securing member.
Figure 11B:
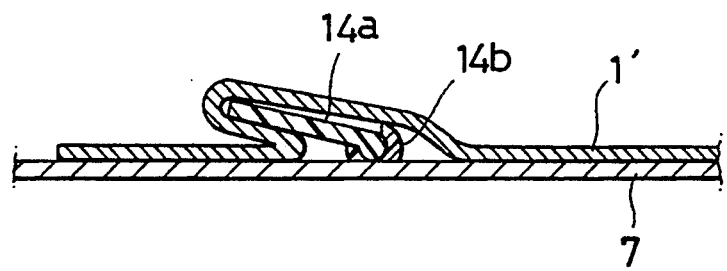
FIG. 11(B) is a sectional view showing the guide member to be set in a horizontal position.
Figure 11C:
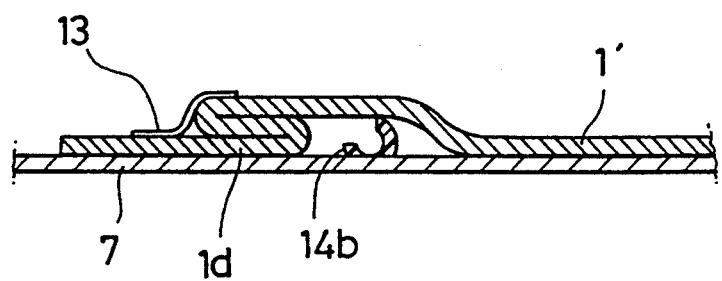
FIG. 11(C) is a sectional view showing the state where the folded portion of trim cover assembly is provisionally retained after having removed a part of the guide member.
Figure 12:
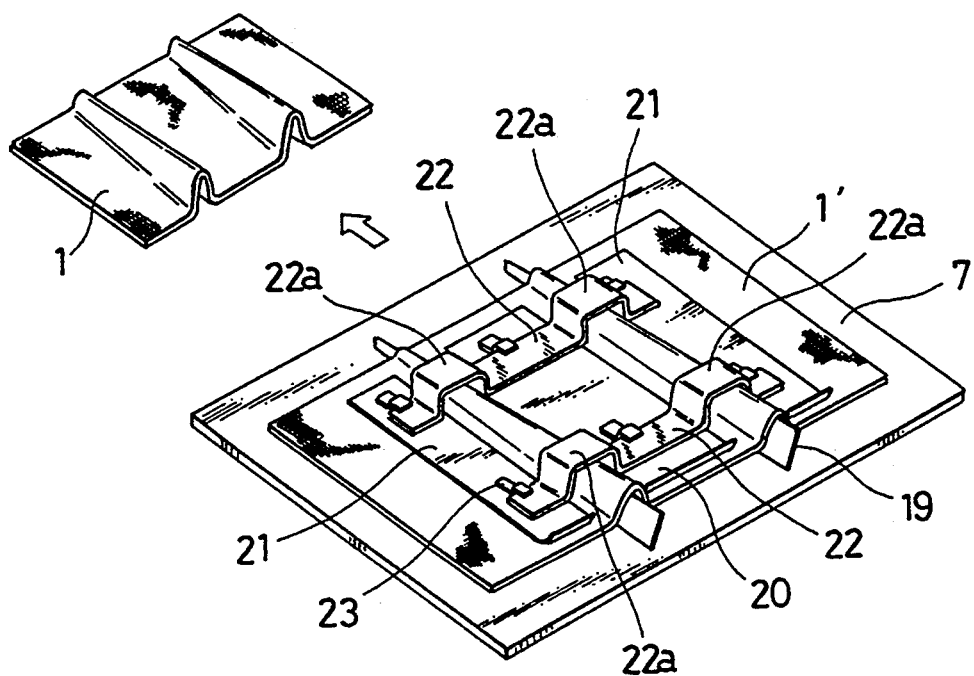
FIG. 12(A) a perspective view of fifth embodiment.
FIG. 12(B) is a sectional view of the fifth embodiment.
FIG. 12(C) is an elevation view of the same.
Figure 12:
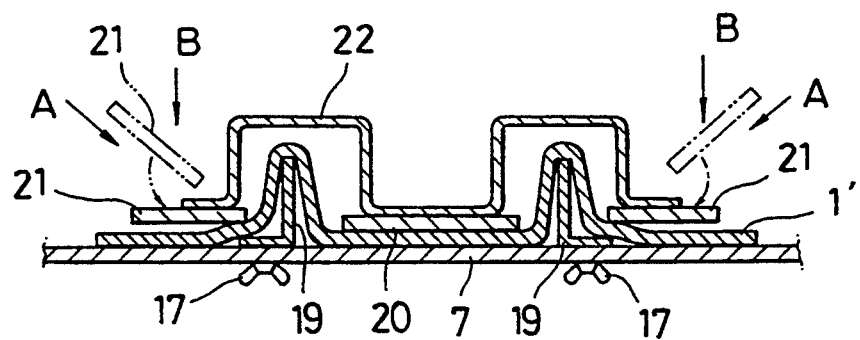
Figure 12:
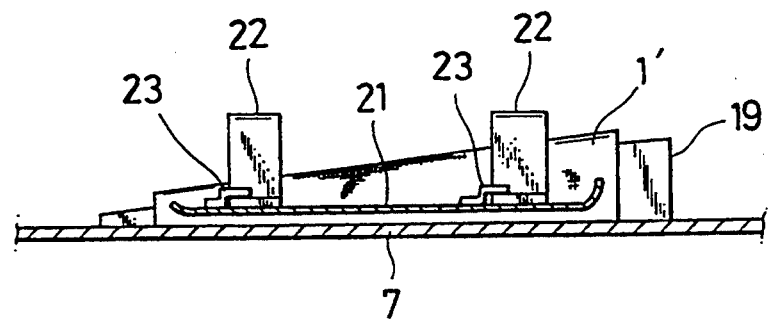

FIGS. 11(A) to 11(C) show a fourth embodiment of feeding device. In contrast to the above first and third embodiments, no such movable guide member is provided in this embodiment. Namely, according to the present embodiment, there is fixed a stationary guide member (14) upon the table (7), which is of a generally third-quarter-circle like cross-section (i.e of a generally U-shaped cross-section), the guide member (14) thus having an elongated opening formed in its longitudinal direction. A plate-like rotatable guide member (12) is connected with this stationary guide member (14) in such a manner that the lower spherical part of rotatable guide (12) is movably received or resiliently grasped in the foregoing opening of stationary guide (14). The rotatable guide member (12) is formed in the same shape with that of the hinged guide member (5) of the first embodiment above, thus having a same sloped upper edge. In operation, the rotatable guide member (12) is located in an upright state upon the stationary guide member (14), and then the trim cover assembly (1') is laid over such vertically erected guide member (12). On the top of thus-placed trim cover assembly, a cap-like securing member (10') is fitted, which can be observed from FIG. 11(A). Next, together with the rotatable guide member (12), the cover member (1') is turned outwardly, like-wise as in the first embodiment, down to the horizontal plane, generally, upon the table (7). That is, the rotatable guide (12) is turned about the center (14) at 90 degrees. Then, as understandable in FIG. 11 (B), the securing member (10') is removed from the trim cover assembly (1), and as seen in FIG. 11(C), the rotatable guide member (12) is removed from the stationary guide one (14), at which step, an adhesive tape (13) is applied to the juxtaposed part (1d) of trim cover assembly (1') as illustrated so as to provisionally secure the same with respect to the table (17). The cover member (1') itself, under this state, is fed to the sewing machine (M).

FIGS. 12(A) to 12(C) show a fifth embodiment of feeding device in the present invention, according to which, like the above fourth embodiment, the trim cover assembly(1') per se is allowed to be fed to the sewing machine. Specifically, as different to the foregoing all embodiments, there are pair of stationary guide members (19)(19) fixed on the table (7) by means of wing nuts (17). These guides members (19) are similar in function to the hinged guide member (5) of the first embodiment, each of them thus having the same sloped upper edge with that of the latter one (5), as can be seen from FIG. 12(C). By adjusting the wing nuts (17), the spacing between the two guide members (19) (19) may be varied to a desired width. Each of guide members (19) are of L-shaped configuration in section, like the one (8') of the third embodiment above, and erected from the table (7). Of course, as discussed previously, the stationary guide members (19) are each disposed at a position corresponding to the respective areas of trim cover assembly (1') which are defined between the imaginary stitch lines (41'', 42''). In operation, the trim cover assembly (1') is laid upon those two stationary guide members (19), after which, firstly, a central weight plate (20) is placed on the central area of trim cover assembly (1') which are defined between the two guides (19) (19), thereby giving a slight pressure thereupon, and secondly, a pair of separate lateral weight plates (21) (21) are respectively placed on both lateral areas of trim cover assembly (1') as best shown in FIG. 12(B). In this way, the cover element (1') is settled on the table (7) such as to lie closely along the respective sloped upper edges of guide members (19). Thereafter, as viewed from FIG. 12(A), a first securing member (22), which has a pair of spaced-apart inverted-U-shaped portions (22a)(22a), is placed upon the left-side region of both central and lateral weight plates (20) (21), and also a second securing member (22') of the identical shape to the first one (22) is placed upon the right-side region of those two weight plates (20) (21). Each of the inverted-U-shaped portions (22a)(22a) are of a height allowing the folded portions of trim cover assembly (1') to pass therethrough. As shown, the securing members (22)(22') are provisionally secured by adhesive tapes (23) to the weight plates (20) (21). The securing members (22) (22') may be fixed to the side of sewing machine (M). With this arrangement, the trim cover assembly (1') is passed through between the table (7) and weight plates (20) (21), with the folded portions of trim cover assembly being slidingly guided along the respective two guide members (19) (19), so as to be fed towards the sewing machine (M).

Figure 13:
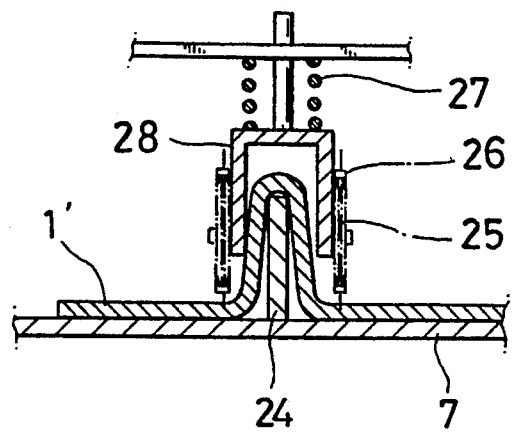
FIG. 13 is a sectional view of sixth embodiment.

FIG. 13 shows a sixth embodiment of feeding device, which comprises a stationary guide member (24) fast upon the table, erecting therefrom, a cap-like securing member (28) which is biased in the downward direction by means of coil spring (27), and a pair of needle endless chains (26), each being provided at the respective both lateral walls of the securing member (28). As shown, each of needle endless chains (26) is attached about a sprocket (25) which is fixed rotatably on the lateral wall of securing member (28). In this embodiment, the pinched and folded portion of trim cover assembly laid on the stationary guide member (24) is positively settled by the needle chain (26) with respect to the table (7), and by rotating the sprockets (26), the trim cover assembly (1') is slidingly moved upon the table (7), with its folded portion being also slidingly passed through between the securing and guide members (28) (24). Thus, the trim cover assembly (1) with its folded portion is fed towards the sewing machine.

Figure 14:
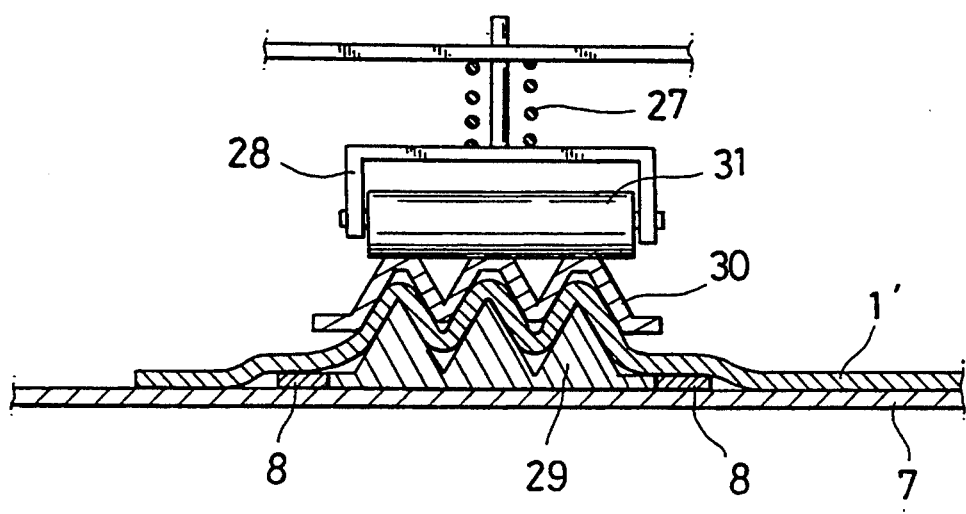
FIG. 14 is a sectional view of seventh embodiment.

FIG. 14 shows a seventh embodiment of feeding device, which comprises a pair of spaced-apart guide rails (8) identical to those (8) of the first embodiment, which are fixed on the table (7), a movable corrugated guide member (29) placed between those two guide rails (8) such as to be slidable therealong upon the table (7), the movable corrugated guide member (29) being so formed that its upper side sloped in its longitudinal direction at a proper inclination angle, an upper corrugated guide member (30), a roller (31) which is rotatably supported by a frame (28), and a coil spring (27) which biases both frame (28') and roller (31) in the downward direction. With this arrangement, the folded portion of trim cover assembly (1') is sandwiched between upper and movable corrugated guide members (29) (30) by way of a pressure being-given from the roller (31) which is biased into contact with the upper corrugated guide member (29). In this case, both upper and movable guide members (29) (30) are fed together with the trim cover assembly (1) towards the sewing machine (M).

The above method and devices may be applied to such a bracket as a moquette or other top surface members.

Figure 1A:
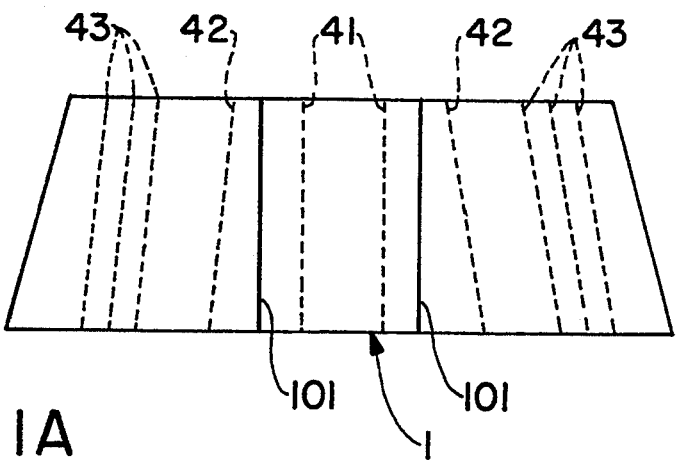
FIG. 1(A) is a plan view of expanded trim cover assembly used in the conventional seat cushion.
Figure 1B:
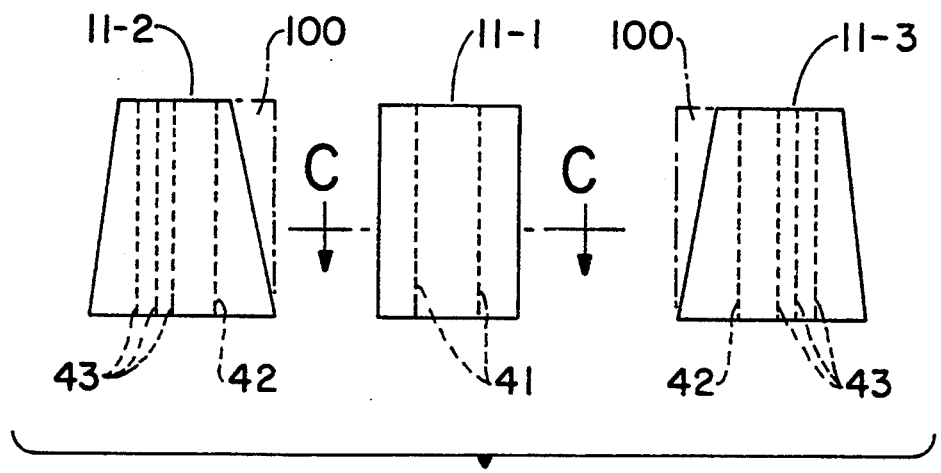
FIG. 1(B) is an exploded view of the trim cover assembly as in FIG. 1(A)
Figure 1C:
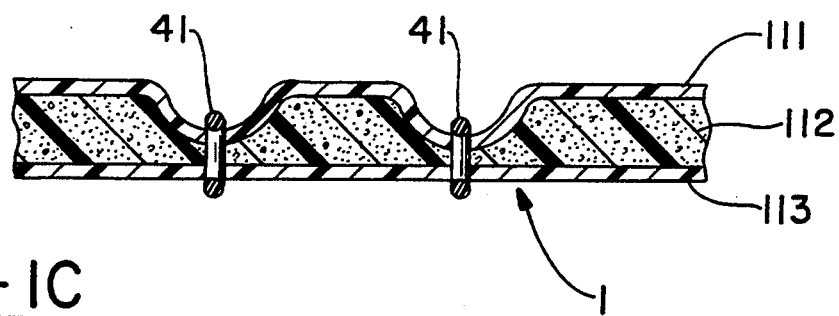
FIG. 1(C) is a partly enlarged sectional view taken along the line C—C of FIG. 1(B)

While the trim cover assembly (1') used is of three-layer lamination as shown in FIG. 1(C), the present invention may be applied to the case where a top surface layer is sewn to a lamination of wadding and wadding cover, or to the case where three separate layers are sewn together.

The guide members mentioned above are all rectilinear in their longitudinal directions, but it may be possible to form the guide members in a curved manner in order to make the stitching curved in the expanded trim cover assembly.

According to the present invention, it is therefore seen that a plurality of non-parallel or slant stitches can be formed on the expanded trim cover assembly by simply subjecting the trim cover assembly stitching by plural needles of ordinary conventional multiple-needle sewing machine. In addition, one unitary sheet of trim cover assembly can be obtained, whose slant stitches thus formed may suitably be transformed into parallel stitches, as applied to such seat cushion (SC) having a sloped protruded portion.

What is claimed is:

1. A seat comprising:
   one unitary sheet of trim cover assembly;
   a set of plural parallel stitches which extend symmetrically relative to a central line of said trim cover assembly; and
   non-parallel stitches which are non-parallel to said central line and are in non-parallel gradually converging relation to each other, said parallel and said non-parallel stitches being formed on said one unitary sheet of trim cover assembly;
   a foam cushion body having a predetermined seat configuration and including uneven surface portions thereon; and
   said one unitary sheet of trim cover assembly being affixed over said foam cushion body such that said non-parallel stitches are disposed at said uneven surface portions of said foam cushion body, thereby presenting a generally parallel stitching pattern upon said seat.

2. The seat as claimed in claim 12, wherein both said one and another sets of stitches are disposed in a symmetrical fashion relative to a central line on said seat, and wherein said cushion body has, formed at its center, a protruded portion whose one end area is great in height and whose another end area is small in height.

3. The seat as claimed in claim 1, wherein a majority of said cushion body is formed flat, and said trim cover assembly with said arranged stitches is affixed over said cushion body.

4. The seat as claimed in claim 1, wherein said trim cover assembly includes lateral sections which serve to effect an attachment to a bottom side of said seat.

5. The seat as claimed in claim 1, wherein said trim cover assembly is bonded to a surface of said cushion body.

6. The seat according to the claim 1, wherein said uneven surface portion includes a protruded portion defined at a center of said foam cushion body corresponding to said central line of said trim cover assembly, and wherein said non-parallel stitches are disposed at or adjacent to said protruded portion, whereby said generally parallel stitching pattern is attained upon seat.

7. The seat according to claim 12, wherein said trim cover assembly only includes one set of non-parallel stitches and another set of non-parallel stitches which are in a non-parallel relation with each other relative to said central line of said trim cover assembly, and wherein said trim cover assembly is of a generally trapezoidal shape, having lateral sides which are each inclined at an angle equal to respective inclined angles of said one and another sets of non-parallel stitches.

* * * * *